United States Patent [19]

Francis

[11] 4,449,428
[45] May 22, 1984

[54] METHOD OF MANUFACTURING RAZOR BLADE ASSEMBLIES

[75] Inventor: John F. Francis, Horsell Woking, England

[73] Assignee: The Gillette Company, Boston, Mass.

[21] Appl. No.: 408,312

[22] Filed: Aug. 16, 1982

[30] Foreign Application Priority Data

Aug. 24, 1981 [GB] United Kingdom ............... 8125748

[51] Int. Cl.³ ...................... B21K 11/00; B23P 11/00; B21J 15/00
[52] U.S. Cl. .................................... 76/104 R; 29/432; 29/509; 29/522 A; 72/379; 76/DIG. 8
[58] Field of Search ...................... 29/432, 509, 522 A; 76/104 R, 101 R, DIG. 8, DIG. 6; 30/46, 346.5, 346.53, 346.54; 72/379

[56] References Cited

U.S. PATENT DOCUMENTS 1,446,095  2/1923  Karaus ............................ 29/432 UX
3,216,758  11/1965  Bohlen ............................. 29/432 X
3,791,016  2/1974  Eberhardt et al. .................. 29/432

FOREIGN PATENT DOCUMENTS 1053695  1/1967  United Kingdom .
1065933  4/1967  United Kingdom .
1280595  7/1972  United Kingdom .
1327381  8/1973  United Kingdom .
1362442  8/1974  United Kingdom .
1403724  8/1975  United Kingdom .

*Primary Examiner*—Roscoe V. Parker
*Attorney, Agent, or Firm*—Raymond J. De Vellis

[57] ABSTRACT

Method of attaching a stainless steel blade member to a support member of cold deformable material, wherein the imperforate blade member (5) is located in a die cavity adjacent a die surface having a through hole (10), the support member (6) is located in the cavity over the blade member (5), and is impacted to effect piercing of the blade member. The slug (7) of blade material displaced into the through hole remains attached by a radial tab (8) to the remainder of the blade, and then the slug is impacted to form a rivet head from the support material which has pierced the blade.

4 Claims, 9 Drawing Figures

METHOD OF MANUFACTURING RAZOR BLADE ASSEMBLIES

This invention relates to the manufacture of razors, and more particularly to a method of permanently attaching a blade member to a support.

Reference is directed to our European Patent Application 79302515.6, Publication No. 0 011 452 A1, in which a support member of metallic or plastics material is placed against an imperforate blade member of stainless steel, backed by a die having through holes. A punch is impacted against the support member, which undergoes plastic deformation, pierces the blade locally and is extruded through the blade into the die holes to form projections which are subsequently riveted over to secure the assembly.

In carrying out the above method, a slug of stainless steel is separated from the blade material and ejected through the corresponding die-hole and difficulty has occasionally been encountered in practice by failure to clear the slug through the hole.

Furthermore, it is essential in the described process for the assembly to be removed from the tool prior to riveting over the projecting pip of support material.

The present invention relates to an improvement in the above described process, in accordance with which the slug is left connected to the remainder of the blade material over a small portion of its periphery and the partially displaced slug is then subject to impact against the extruded pip to form a rivet head, the whole operation preferably being carried out in one press tool.

A preferred method and press tool for carrying out the method, both in accordance with the invention, are described below, by way of example, with reference to the accompanying drawings, in which.

Figure 1:
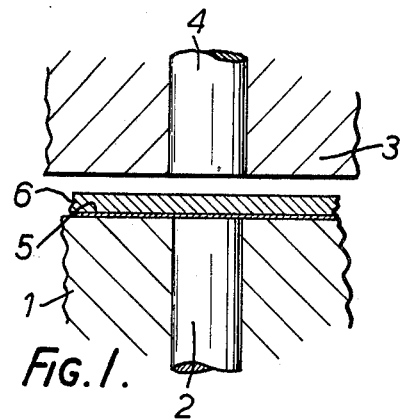
FIGS. 1 to 7 show in section successive stages in the method.

The press tool comprises a lower die 1 having at least one through hole in which an anvil 2 is closely fitted, and a top pressure pad 3 having a through hole to receive a punch 4.

The upper surface of the die includes locating means, not shown, for location of a sharpened stainless steel blade member 5 and a superimposed support member 6 of cold deformable material which may be a relatively soft metal or metal alloy, or a plastics material.

FIG. 1 shows the tool open and the blade and support located over the die hole and anvil.

Figure 2:
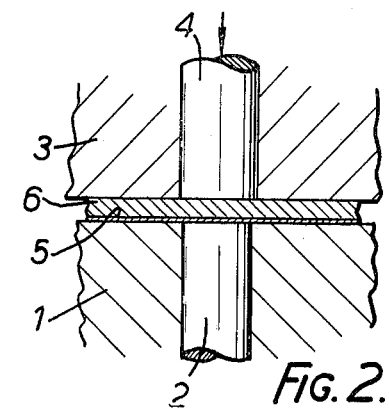
Figure 3:
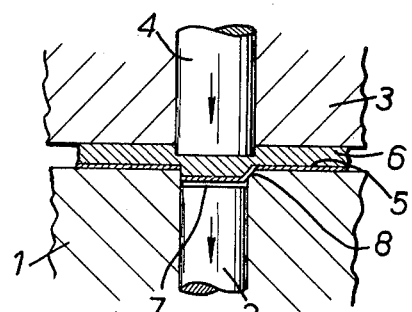
Figure 4:
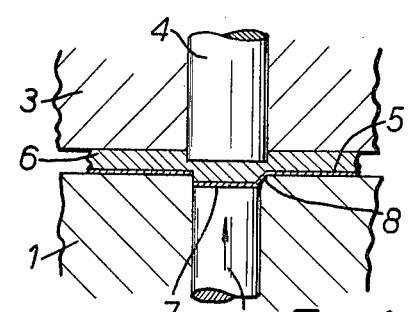
Figure 5:
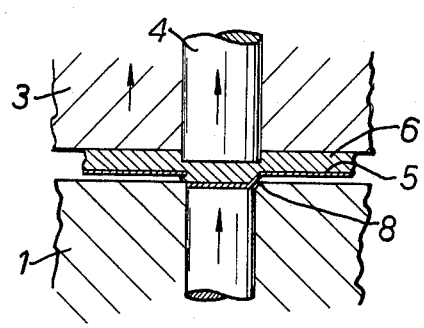

In FIG. 2 the pad and die descend to a closed position, to sandwich the blade member and support, and the punch is then impacted against the support (FIG. 3) causing it to deform locally and to sever a slug 7 of the blade material except at a localized region 8 at which a tab of blade material is left to connect the slug with the remainder of the blade. A pip of support member material thus projects through the hole which it has pierced in the blade. In this process the anvil 2, which has been lightly loaded against the blade member is displaced downwardly by the impact. In FIG. 4, the punch is shown at the bottom of its stroke, at which point downward pressure on the pad and punch is removed and the anvil starts to rise. In the position shown in FIG. 5, the pad and punch have risen in unison and the anvil is forced upwardly against the displaced slug to apply pressure to the extruded pip of support material, causing it to spread laterally between the slug and the blade and thus secure the blade, as by riveting, to the support.

Figure 6:
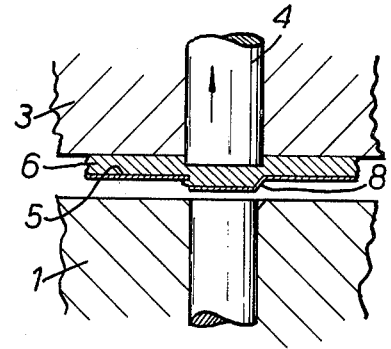

Continued upward movement of the pad, punch and anvil raises the riveted pip and slug clear of the die upper surface (FIG. 6).

Figure 7:
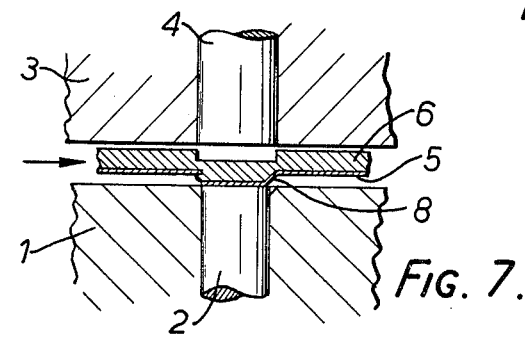

Finally, as illustrated by FIG. 7, the punch and pressure pad are raised to the original open position, and the anvil is raised flush with the upper surface of the die, whereupon the blade assembly is ejected laterally from the space between the press tool parts, which are then ready for a fresh cycle to commence.

Figure 8:
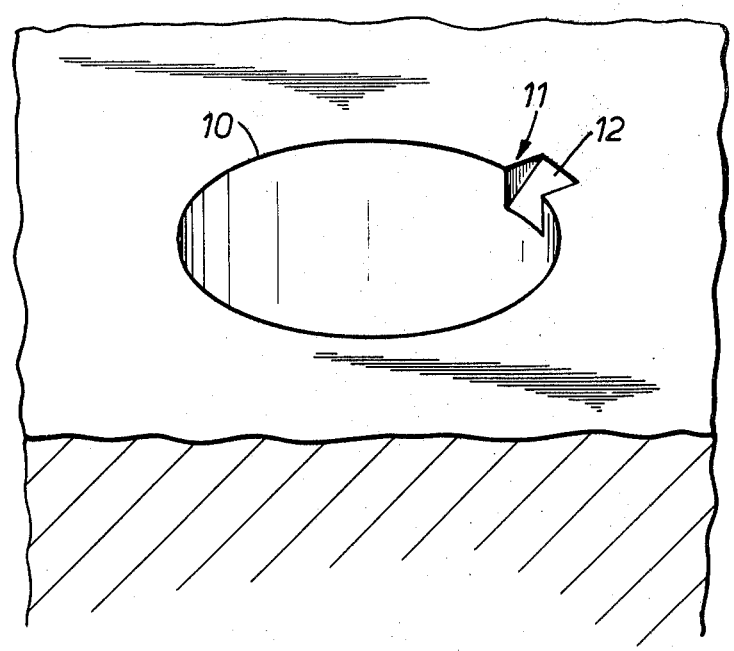
FIG. 8 is an enlarged perspective view of one die hole.

FIG. 8 is an enlarged perspective view of the die hole, which is sharp-edged over the bulk of its periphery 10, but is locally relieved by a narrow slot 11 whose bottom wall 12 slopes downwardly and inwardly from the upper surface of the die towards the hole. It is this slot which assures retention of the slug to the blade member by a narrow radial tab.

The process has been described so far with reference to the formation of a single displaced slug and associated rivet, but in practice the tool would normally provide for the formation of a number of slugs and rivets spaced apart along the length of the blade and support members.

Figure 9:
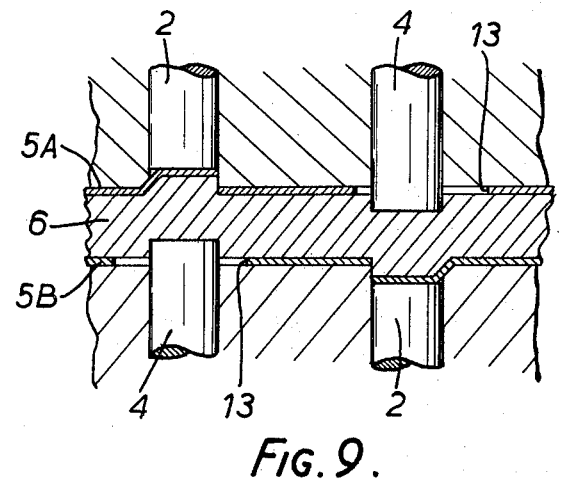
FIG. 9 is a section of a modified form of the method and tool.

FIG. 9 illustrates diagrammatically a corresponding process in which two blades 5A, 5B are secured to opposite faces of a common support member or spacer 6, to form a tandem blade assembly. In this case, the press tool is preferably adapted to form respective rivets on both sides of the support member simultaneously, although the processes of riveting the two blades to the spacer could be performed sequentially and in separate press tools if desired. Clearance holes 13 are formed in the blade members to permit free passage of the respective punches 2.

In each case, the blade member and support may be formed as long, superposed strips which are moved sequentially through the press tools and then severed laterally to form individual blade assemblies.

I claim:

1. A method of attaching a razor blade member to a support member of cold deformable material, employing tool means comprising a die having a blade member support surface and at least one through hole opening on to said surface; a co-operating pressure pad; and a punch supported by said pressure pad in registry with said hole; said method comprising the steps of:
   (a) locating said blade member against said support surface and superposing said support member on said blade member;
   (b) impacting said punch against said support member thus causing said support member to undergo plastic deformation and to pierce the blade member and form a projection displacing a slug of material from said blade member into said hole, said slug remaining connected to the remainder of said blade member over a minor portion of its periphery; and
   (c) subjecting the said slug to impact to deform said projection to form a rivet head securing the blade member to the support member.

2. The method as claimed in claim 1, wherein said tool means includes an anvil located in said throough hole, and wherein the said step (c) is effected by impacting said anvil against said projection.

3. The method as claimed in claim 1, wherein said die is formed with a localized radial slot adjacent said through hole, said slot having a bottom surface extending downwardly and inwardly relative to the hole, whereby in the performance of step (b), a radial tab is formed within said slot by which said slug is connected to the remainder of the blade member.

4. The method as claimed in claim 1, adapted to the attachment of two razor blade members to opposite sides of the support member, wherein the said steps (a), (b) and (c) are employed for attaching each said blade member to the support member to form a riveted sandwich assembly of two blade members and a spacer constituted by the support member.

* * * * *